(No Model.) 2 Sheets—Sheet 1.

W. F. JOHNSON.
CORN PLANTER.

No. 454,871. Patented June 30, 1891.

Witnesses
Percy C. Bowen

Inventor
William F. Johnson
By his Attorneys,
C. A. Snow & Co.

(No Model.)  2 Sheets—Sheet 2.
W. F. JOHNSON.
CORN PLANTER.
No. 454,871. Patented June 30, 1891.
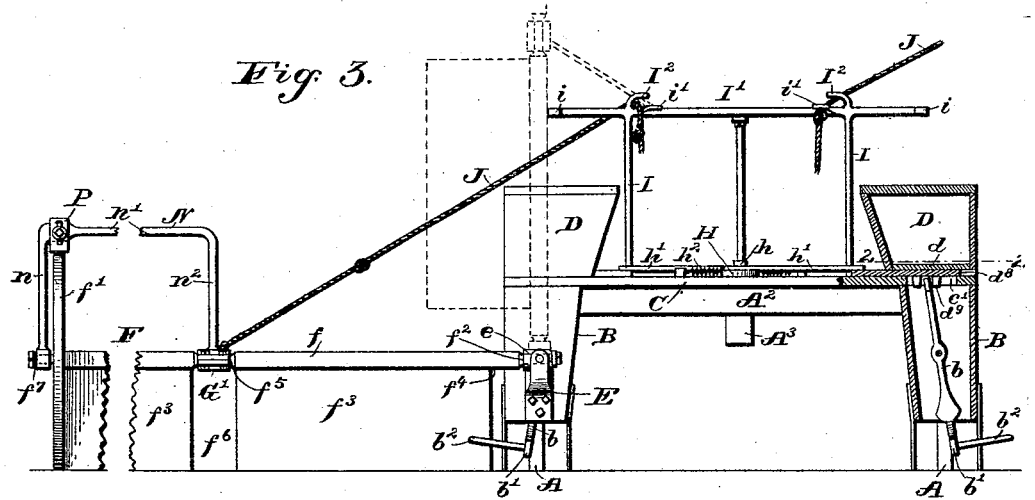
*Fig. 3.*
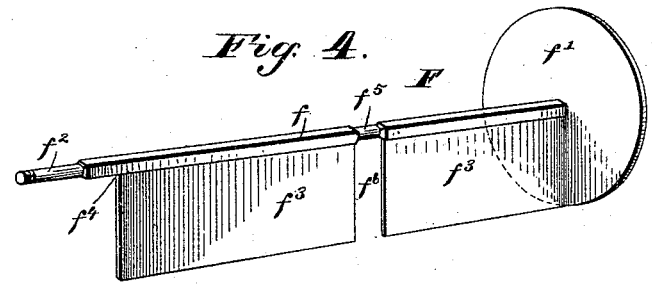
*Fig. 4.*
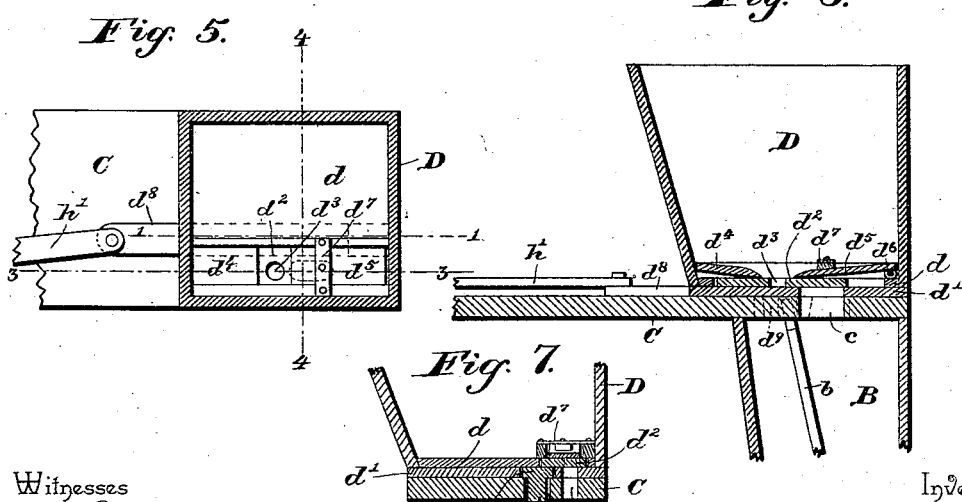
*Fig. 5.* *Fig. 6.* *Fig. 7.*
Witnesses
Percy C. Bowen
J. A. Saul
Inventor
William F. Johnson,
By his Attorneys,
C. A. Snow & Co.

UNITED STATES PATENT OFFICE.

WILLIAM FAYETTE JOHNSON, OF MOORESVILLE, INDIANA.

CORN-PLANTER.

SPECIFICATION forming part of Letters Patent No. 454,871, dated June 30, 1891.

Application filed December 30, 1890. Serial No. 376,257. (No model.)

*To all whom it may concern:*

Be it known that I, WILLIAM FAYETTE JOHNSON, a citizen of the United States, residing at Mooresville, in the county of Morgan and State of Indiana, have invented a new and useful Corn-Planter, of which the following is a specification.

This invention relates to corn-planters, the object in view being to provide a machine of this class which, while planting a double row of corn, will make a mark upon the ground parallel with the rows planted and at a suitable distance therefrom to serve as a guide for the machine in planting the two rows next succeeding, and at the same time will make a mark at right angles to the rows already planted, the latter marks extending laterally from each hill of corn. Thus when the field is planted it will be laid off at right angles or in squares, with the planted hills at the corners of the squares. These objects and such others as fairly fall within the scope of the invention I attain by means of the mechanism illustrated in the accompanying drawings, the peculiar construction, combination, and arrangement of which will be hereinafter fully described, and the specific points of novelty particularly pointed out in the claims.

Figure 8:
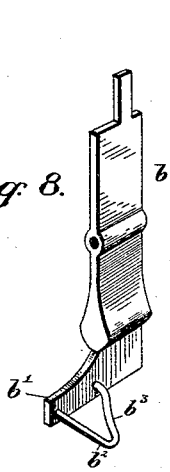
Figure 1:
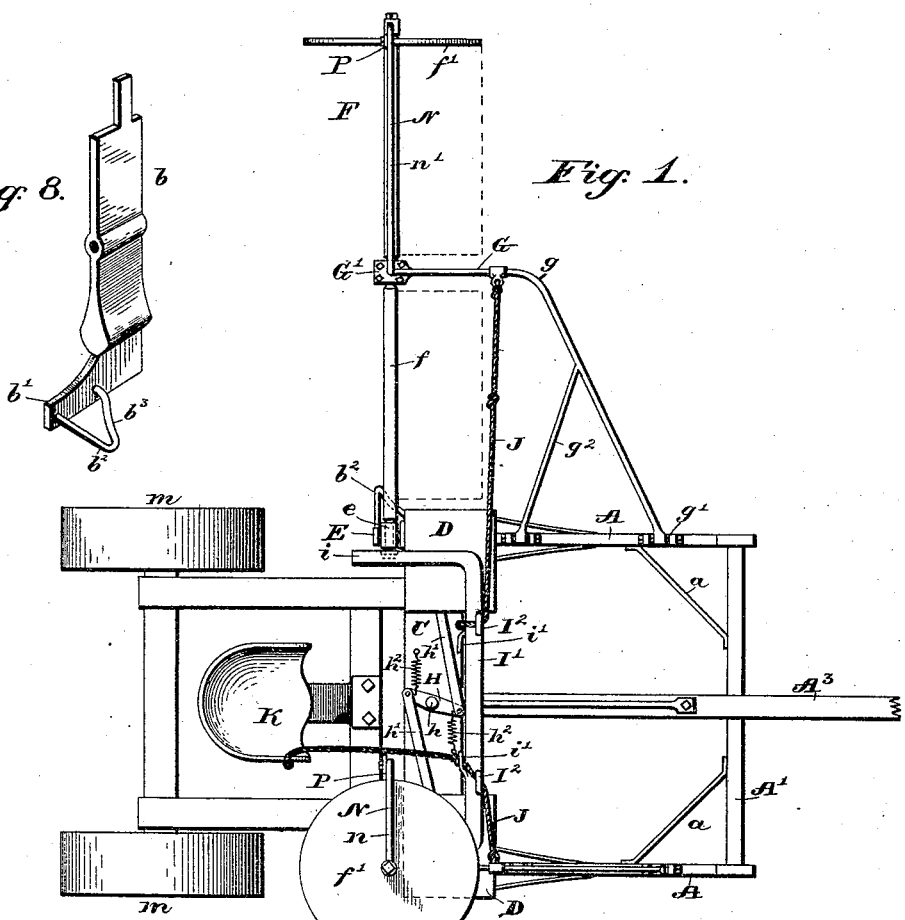
Figure 2:
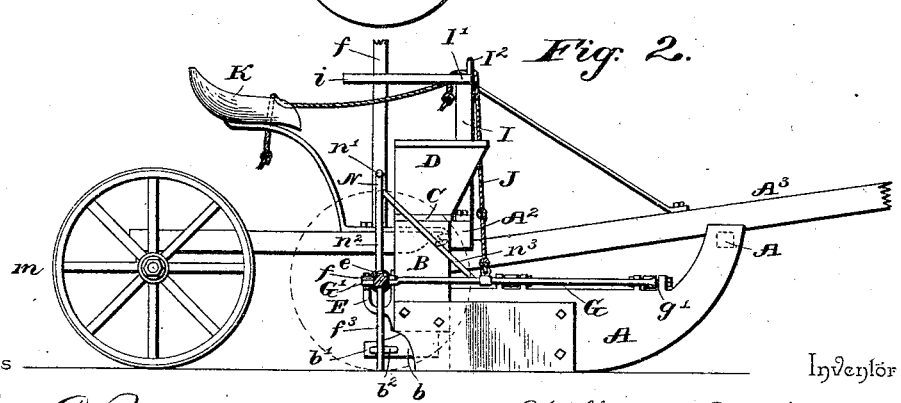

In the drawings, Figure 1 is a plan view of my improved corn-planter. Fig. 2 is a side elevation of the same with the marking-disk removed. Fig. 3 is a rear elevation of the forward or runner frame thereof, showing the marker connected to one side and the other side in section, taken through one of the seed-droppers on the line 1 1 of Fig. 5. Fig. 4 is a perspective view of the marker. Fig. 5 is a horizontal sectional view through the seed-hopper on the line 2 2 of Fig. 3. Fig. 6 is a sectional view on the line 3 3 of Fig. 5. Fig. 7 is a transverse sectional view on the line 4 4 of Fig. 5, and Fig. 8 is a perspective view of the lever or flirt-valve for operating the seed-dropper.

Like letters of reference indicate corresponding parts in the several views.

The portion of the corn-planter in which my invention resides consists of a rectangular frame composed of the runners A A, secured together by the transverse beams A' A² and braced in any suitable manner—as, for instance, by braces $a\ a$—said frame having a central tongue A³, as is usual in machines of this class. A seed-spout B is secured to the rear of each of the runners A and extends for a suitable distance above the top of the said runner, and the lower end thereof terminates a short distance above the ground. A board C extends transversely across the frame of the machine, and is secured at its ends upon the tops of the seed-spouts B. The seed-hoppers D D are mounted upon the ends of the board C directly over the said seed-spouts, and are provided with a double bottom consisting of two pieces $d\ d'$, which rest upon the board C and have suitable slots for the seed-dropping mechanism to operate in. Upon the rear sides of the seed-spouts B are mounted brackets E, in which are pivoted journal-sleeves $e$. The markers F each consist of a beam $f$, to the outer end of which is secured a circular disk $f'$. The inner end of the beam $f$ is formed into a journal $f^2$, which is journaled in the sleeve $e$, pivoted in the bracket E upon the rear side of the seed-hopper.

From the foregoing it will be understood that the markers F extend laterally from the sides of the planter, and the disks $f'$ are adapted to roll upon the ground and make a mark thereon at some distance from the sides of the machine, the journals $f^2$ turning freely in the bearing-sleeves $e$. A thin plate $f^3$ is secured at one end to the disk $f'$ and extends along the beam $f$, having one edge secured thereto, terminating at a point $f^4$ a suitable distance from the journal $f^2$ to allow the plate $f^3$ to revolve with the beam $f$ without coming in contact with the seed-spout B. The beam $f$ has a second journal $f^5$ about the center thereof, which revolves in a journal-box G' upon the end of a brace G.

The plate $f^3$ is divided into two plates by a slot $f^6$, which extends from the outer edge thereof to the journal $f^5$, so as to allow the marker to revolve without interference from the brace G. The said brace G is straight from the journal-box G' to a point beyond the circumference of the circle described by the plate $f^3$ in its revolution, where it is curved, as at $g$, and extends to the top edge of the runner upon the adjacent side of the machine, where it is pivoted, as shown at $g'$. A brace $g^2$ is similarly pivoted upon the edge of the runner in rear of the brace G and is connected thereto, as shown in Fig. 1. Thus the marker has two journal-bearings. The sleeve $e$ and and the box G', the pivotal points of the sleeve $e$, and of the braces G and $g^2$ are all upon the same horizontal plane, so that the said markers may be raised to a vertical position, turning upon the aforesaid pivotal points, as will be readily understood.

A U-shaped yoke N is journaled upon the round outer end $f^7$ of the beam $f$, which projects through the disk $f'$ and extends upwardly, as at $n$, and horizontally, as at $n'$, and finally is bent downwardly, as at $n^2$, and secured rigidly to the journal-box G'. A scraper P is adjustably secured to the horizontal portion $n'$ and arranged over the disk $f'$ to remove the earth from the periphery thereof.

A brace $n^3$ may be extended from the upright part $n^2$ to the brace G.

The foregoing description of one of the markers will apply equally well to both, as the construction of the two are identical.

In the bottoms $d$ of the seed-hoppers D are formed slots in which the seed-slides $d^2$ reciprocate. The seed-slides $d^2$ have the openings $d^3$ formed therein of sufficient size to hold the proper number of kernels of corn for one hill, and are arranged to slide over an opening $c$, formed through the bottom $d'$ and the board C at the proper time for dropping the corn. Two inclined pieces $d^4$ and $d^5$ are arranged to guide the corn toward the opening $d^3$, and the piece $d^5$ is hinged at its outer end, as at $d^6$, and has a suitable spring $d^7$, which operates on the upper side of the piece $d^5$ to keep the latter pressed in contact with the seed-slide $d^2$ to cut off the corn in the hopper from the opening $d^3$ when the latter passes under the said piece $d^5$ to drop the corn. Should the corn in the opening $d^3$ project high enough to strike the piece $d^5$, the spring $d^7$ will allow the said piece $d^5$ to rise, and thus prevent the corn from becoming wedged thereunder. The seed-slides $d^2$ are secured to slides $d^8$, which reciprocate in the lower part $d'$ of the bottoms of the hoppers, the said slides $d^8$ having two teeth $d^9$, projecting downwardly into slot $c'$ in the ends of the boards C.

Pivoted in the seed-spouts B are the dropping flirt-valves $b$, the upper ends of which are reduced in size to fit between the teeth $d^9$ of the slide $d^8$. The lower ends of the dropping flirt-valves $b$ extend below the ends of the seed-spouts B and have rearward extensions $b'$, which extend under the centers of the beams $f$ of the markers. To the extensions $b'$ are secured laterally-extending brackets $b^2$, having their forward sides beveled, as at $b^3$, and the said brackets extend into the path of the plates $f^3$, so that as the marker revolves the said plates $f^3$ will come in contact with the beveled side $b^3$ of the brackets $b^2$, thus forcing the lower end of the flirt-valves $b$ inwardly, causing their upper ends to move outwardly and reciprocate the seed-slides to drop the corn, as will be readily understood.

In order to return the seed-slides to their normal positions, I provide a lever H, pivoted to the board C near the center thereof, as at $h$. The slides $d^8$ extend through the inner side of the hoppers D, and are connected by the links $h'$ with opposite ends of the lever H, as shown in Fig. 1. Coiled springs $h^2$ are also secured to the ends of the lever H, and serve to return the said lever and the seed-slides to their normal positions, as will be readily understood. From the foregoing it will be seen that when one seed-dropper is operated it will act through the links $h'$ and the lever H to operate the other seed-dropper at the same time.

A frame consisting of two uprights I I and a horizontal piece I' is secured upon the rear beam $A^2$ of the runner-frame and extends upwardly a short distance above the hoppers. The ends of the horizontal piece I' extending beyond the uprights I I are bent rearwardly, as at $i$ $i$, for a purpose to be hereinafter explained.

$I^2$ $I^2$ designate hooks formed of smooth round iron through which the ropes J J pass. The said ropes J are connected at one end to the straight portion of the braces G near the curve $g$ thereof and extend through the hooks $I^2$. When it is desired to raise the markers, the driver has only to pull upon the inner ends of the said ropes J, pulling the ropes through the said hooks, and thus raising the markers to a vertical position, as shown in dotted lines in Fig. 3. When in this position, the markers will rest against the bent ends $i$ of the horizontal piece I', and they will be retained in this position by means of the catches $i'$ $i'$ upon the piece I' near the hooks $I^2$ under which the ropes are placed, knots J', formed at the proper places in the said ropes, preventing them from slipping through the said catches $i'$.

The seat K for the driver is mounted upon a suitable frame, which is supported upon the wheels $m$ and hinged at its forward end to the rear brace $A^2$ or other suitable point of the forward frame of the machine.

The operation of my invention is as follows: When in use, the marker upon one side of the machine rests upon the ground, while the one upon the opposite side is retained in its vertical position. As the machine moves forward the marker rolls upon the ground, the disk thereof marking a line in the field parallel with the rows which are being planted, and at a distance from the machine equal to one and one-half times the distance apart of the rows. The circumference of the disk $f'$ is made equal to the distance it is required to plant the hills from each other, and as the marker revolves the plate $f^3$ will press upon the ground once during each revolution and mark a line at right angles to the line marked by the disk $f'$. As the said plate $f^3$ nears the ground its inner end will come in contact with the inclined side of the bracket $b^2$, thereby forcing the lower end of the seed-dropping lever inward to effect the dropping of the corn, and these movements are so timed that the corn will be dropped in the angle marked upon the ground by the rows in which the hills are planted and the marks made by the plates $f^3$. When the end of the field is reached, the marker is raised, the planter turned round, the tongue thereof placed over the mark made by the disk $f'$, the seed-spouts are brought to the line marked by the plates $f^3$. The marker upon the opposite side is then lowered, and the side having the plates $f^3$, being the heaviest, will turn toward the ground, coming in contact with the bracket $b^2$ to operate the seed-dropper, thereby dropping the corn in the first hill. The planter is then started onward and the operation goes on as before stated.

The marker may be easily raised over stumps or other obstructions by the driver without dismounting from his seat upon the machine, and after passing such obstruction the marker should be held in a raised position until the seed-spouts come in line with the cross-mark, when it may be lowered at the proper time to continue without disarranging the marking of the field.

By use of my invention a field may be planted and marked off both ways in an easy and convenient manner, and this may be accomplished by the mechanism hereinbefore described, which is simple and cheap in construction, durable, and very effective for the purpose designed.

It will be understood that I do not wish to limit myself to the precise details of construction herein shown and described; as I am aware that modifications may be made therein without departing from the spirit of the invention—as, for instance, if found desirable in practice I may pivot the marker to the sides of the seed-spouts B, instead of to the rear sides, or the board C may terminate before passing under the hoppers and may have an iron plate secured thereto upon which to mount the said hoppers.

Having thus described my invention, what I claim, and desire to secure by Letters Patent, is—

1. In a corn-planter, the combination of the frame of the machine, journal-bearings pivoted to the said frame, braces hinged to and extending laterally from the frame, journal-boxes upon the ends of the said braces, with a marker mounted in said journal-bearings and adapted to roll at the side of the frame, and mark-lines extending laterally therefrom, said marker having a disk to roll upon the ground and mark lines at right angles to the aforesaid lines, substantially as described, and for the purpose set forth.

2. In a corn-planter, the combination of the frame of the machine, journal-bearings pivoted to the said frame, braces hinged to and extending laterally from the frame, journal-boxes upon the ends of the said braces, with a marker mounted in said journal-bearings and adapted to roll at the side of the frame and mark lines extending laterally therefrom, said marker having a disk to roll upon the ground and mark lines at right angles to the aforesaid lines, U-shaped frames N, secured to the journal-boxes upon the outer ends of the braces and extending over the marking-disk to journals upon the outer ends of the marker, and a scraper arranged upon the U-shaped frame above the marking-disk to remove the dirt from the said disk, substantially as described, and for the purpose set forth.

3. In a corn-planter, the combination of a seed-hopper, the seed-slide in the bottom of the said hopper, the lever H, pivoted between said hoppers and having its ends connected with the said seed-slides, springs for returning the said seed-slides to their normal position, and flirt-valves $b$, pivoted within the seed-spout below the said seed-hoppers and arranged to operate the said seed-slides, with the marker arranged to roll at the side of the planter and operate the lower ends of the flirt-valve $b$ at the proper times to drop the seed, substantially as described.

4. In a corn-planter, the combination, with the frame of the machine, seed-hoppers mounted thereon, seed-slides arranged within said hoppers, seed-spouts extending downwardly below the said hoppers, flirt-valves pivoted within said seed-spouts, and extensions from the lower ends of the said levers, of markers journaled upon the said seed-spouts adapted to mark the field in squares and arranged to operate upon the extensions at the lower ends of the said flirt-valves to cause the dropping of the seed, substantially as described, and for the purpose set forth.

5. In a corn-planter, the combination of a frame mounted upon runners, seed-spouts attached to the rear ends of the said runners, seed-hoppers mounted above said seed-spouts, seed-slides in the bottoms of the hoppers, flirt-valves pivoted in the said seed-spouts and arranged to operate the said seed-slides, journal-bearings pivoted to the seed-spouts, and braces hinged to the runners and having journal-boxes G' at their outer ends, with a marker consisting of a beam $f$, journaled in the said journal-bearings, a disk $f'$, secured to the outer end of the said beam $f$ to mark longitudinally, and plates $f^3$, secured to said disk and beam to mark transversely of the field, a yoke-piece N, arranged over the disk $f'$, secured to the journal-box G' and journaled upon the outer end of the beam $f$, a scraper P, mounted upon the said yoke-piece N and arranged to scrape the earth from the periphery of the disk $f'$, the plates $f^3$ of the marker being arranged to operate the seed-dropping levers, substantially as described, for the purpose specified.

In testimony that I claim the foregoing as my own I have hereto affixed my signature in presence of two witnesses.

WILLIAM FAYETTE JOHNSON.

Witnesses:
J. H. SIGGERS,
R. J. MARSHALL.